Dec. 11, 1923.

M. STAMM ET AL

AIR COOLED ELECTRIC MOTOR

Filed March 16, 1920   4 Sheets-Sheet 1

1,476,776

INVENTORS
Max Stamm, Harry Tucker
and Martin J. Peltz
by H. J. Fenton
ATTORNEY.

Dec. 11, 1923.

M. STAMM ET AL

AIR COOLED ELECTRIC MOTOR

Filed March 16, 1920   4 Sheets-Sheet 3

INVENTORS
Max Stamm, Harry Tucker
and Martin J. Peltz
By H. V. Hutton
ATTORNEY.

Dec. 11, 1923.                                                                              1,476,776

M. STAMM ET AL

AIR COOLED ELECTRIC MOTOR

Filed March 16, 1920                 4 Sheets-Sheet 4

INVENTORS
Max Stamm, Harry Tucker
and Martin J. Peltz

ATTORNEY.

Patented Dec. 11, 1923.

1,476,776

UNITED STATES PATENT OFFICE.

MAX STAMM, HARRY TUCKER, AND MARTIN J. PELTZ, OF PHILADELPHIA, PENNSYLVANIA.

AIR-COOLED ELECTRIC MOTOR.

Application filed March 16, 1920. Serial No. 366,225.

*To all whom it may concern:*

Be it known that we, MAX STAMM, HARRY TUCKER, and MARTIN J. PELTZ, all citizens of the United States, and all residing in the city of Philadelphia, State of Pennsylvania, have jointly invented certain new and useful Improvements in Air-Cooled Electric Motors, of which the following is a full, clear, and exact description, reference being had to the accompanying drawings, forming a part of this specification.

This invention relates generally to air-cooled electric motors, and particularly to suction-producing or air-driving mechanism, including means for deadening the sound usually incident thereto, and forming in combination with the motor, its casing and armature shaft, an efficient means constituting a cooled and silent running motor, well adapted for most uses for which such a motor is applicable, including particularly the use of the combined mechanism, with the motor element as the driving means, in conjunction with its novel adjunctive elements hereinafter described, for the operation of a player piano or organ, or other like devices, which are operated by a partial vacuum or the reverse, created in its pneumatically-operated part, as the primary actuating means therefor.

Serious difficulties have been heretofore experienced in attempts to produce a combined mechanism of this character which would prevent the overheating of the operating motor thereof and which would provide the desired suction, and in which the noise incident to the operation thereof was sufficiently deadened or eliminated to permit the machine to be used in connection with pneumatically operated musical instruments where the substantial absence of sound from the suction-producing mechanism is essential.

The objects of our invention are to overcome the aforesaid objections heretofore arising; and. with these objects in view, our invention consists in the novel construction, combination and arrangement of parts hereinafter described and claimed.

In the accompanying drawings, illustrating our invention.

Referring to the drawings, 2 designates an outer sound muffling casing which encloses the supporting frame 5 of an electric motor.

The motor frame 5 is preferably formed in four separable sections 6, 7, 8 and 9. The two central sections 7 and 8 are secured together by suitable screws 11 and they form a central cylindrical wall 12 which surrounds and encases the armature, commutator and field elements of the motor, as will hereinafter appear. The outer ends of the sections 7 and 8 are provided with projecting annular flanges 13 and 14, the outer faces of which are engaged by the inner faces of the end sections 6 and 9, respectively. The end sections 6 and 9 are secured to the inner sections 7 and 8, respectively, by suitable cap screws 15 which penetrate the flanges 13 and 14 from the inner sides thereof and which are screwed into the sections 6 and 9.

The armature 16 of the motor is carried by the motor or armature shaft 17 which is supported in two ball bearings 18 between which the armature 16 is located. One ball bearing 18 is supported in a wall 19 which closes one end of the cylindrical wall 12, and the other ball bearing 18 is supported in an arm or pillar 20 formed in the frame section 7 and extending across but not closing the other end of the cylindrical wall 12.

Figure 3:
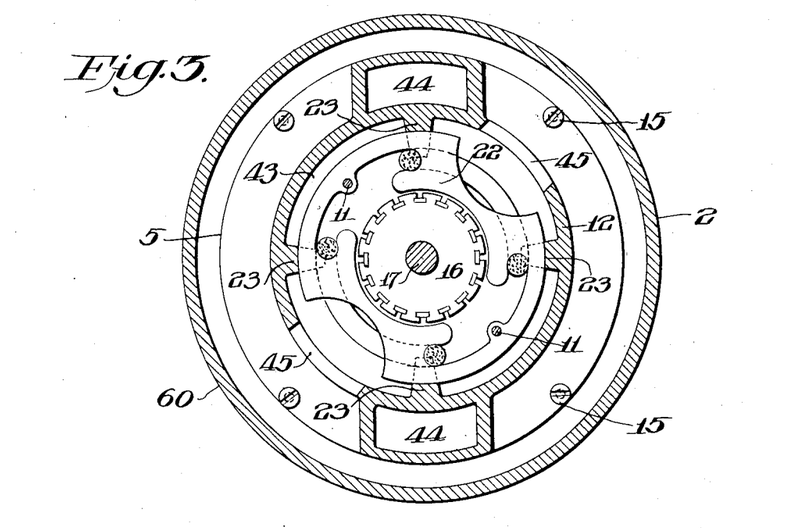
Figures 3 and 4 are transverse sections through the machine, on lines 3—3 and 4—4, respectively of Fig. 1.
Figure 4:
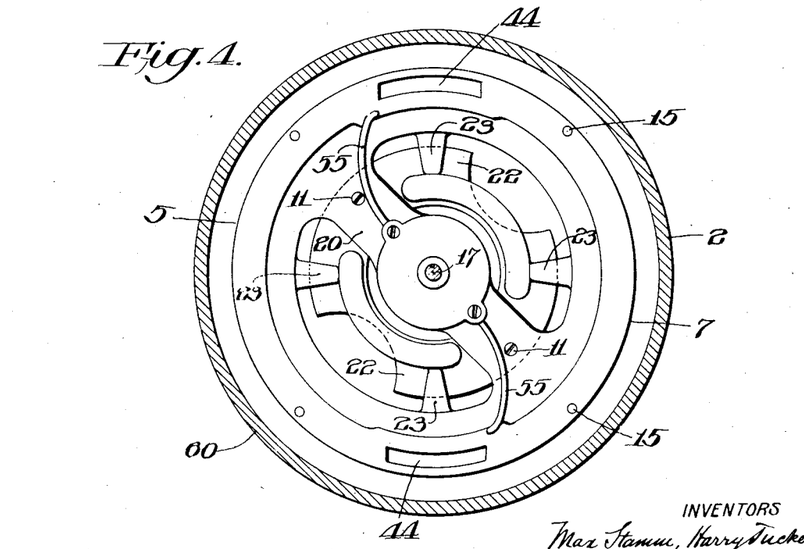
Figure 10:
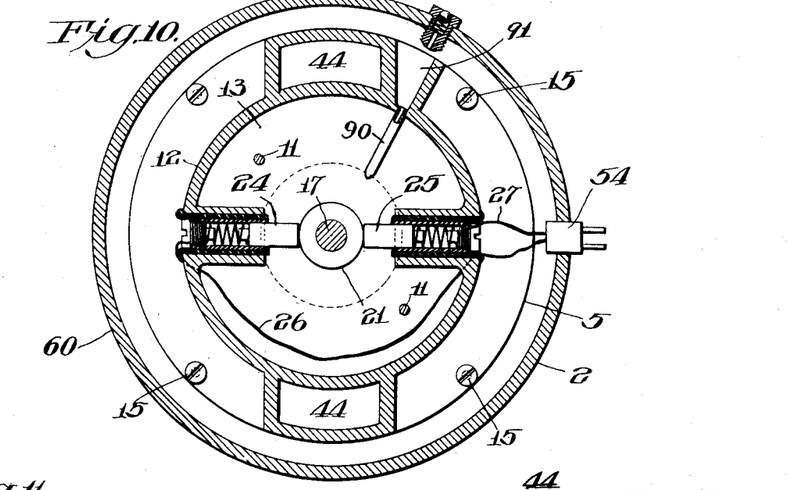
Figure 10 is a transverse section through the machine, on line 10—10 of Fig. 1.

The shaft 17 carries the motor commutator 21 between one end of the armature 16 and the adjacent bearing 18. The motor field magnets 22 are supported inwardly of and spaced from the cylindrical wall 12 by lugs 23 which project inwardly from the wall 12, and they are constructed and related to the armature 16 as clearly shown in Figs. 1, 3 and 4. The commutator brushes 24 and 25 are contained within the cylindrical wall 12 and they are supported thereby; and the wires 26 and 27 leading to the brushes 24 and 25 for the supply of current to the motor enter the outer casing 2 through a suitable plug 54 in the wall thereof, as shown in Fig. 10. When current is supplied to the motor the armature shaft 17 thereof is rotated in the usual well known manner.

The end sections 6 and 9 of the motor frame are cylindrical in form, having their inner faces fitted against the outer faces of the flanges 13 and 14 of the central frame sections, and being provided with outer end walls 27' and 28 having central air inlet openings 29 and 30, respectively, therein. Within the frame section 6 is a frame section 31 comprising a cylindrical portion 32, having its inner face flush with inner face of the frame section 6 and fitted against the outer face of the flange 13, and having an outer end wall 33 provided with a central air inlet opening 34. The frame section 31 is held centrally within the frame section 6 in spaced relation thereto by spacing lugs 34' and 35 projecting from the section 6 to the section 31 and by rivets 36 penetrating the end wall 33 of the section 31 and the lugs 34' of the section 6. The frame sections 6 and 31 are spaced from each other to provide air passages 37 between the cylindrical walls of the sections and to provide air passages 38 between the end walls of the sections and communicating with the passages 37, for a purpose hereinafter explained.

The motor frame sections 6 and 9 enclose chambers 39 and 40 which contain air driving fans 41 and 42, respectively, secured upon and carried by the respective ends of the armature shaft 17, and which may be of any approved form. The chamber 39 communicates with and forms, in effect, a continuation of the space or chamber 43 surrounded by the wall 12, and the chamber 43 is separated from the space or chamber 40 by the wall 19. The central frame sections 7 and 8 are provided with abutting walls which enclose two oppositely disposed air passages 44 which extend between the flanges 13 and 14 and communicate at their respective ends with the chamber 40 and passages 37. The cylindrical wall 12 is provided with air outlet openings 45 located between the frame wall 19 and the armature and field elements of the motor, affording communication between the chamber 43 and the casing 2 exteriorly of the motor frame 5, for a purpose presently appearing.

Figure 1:
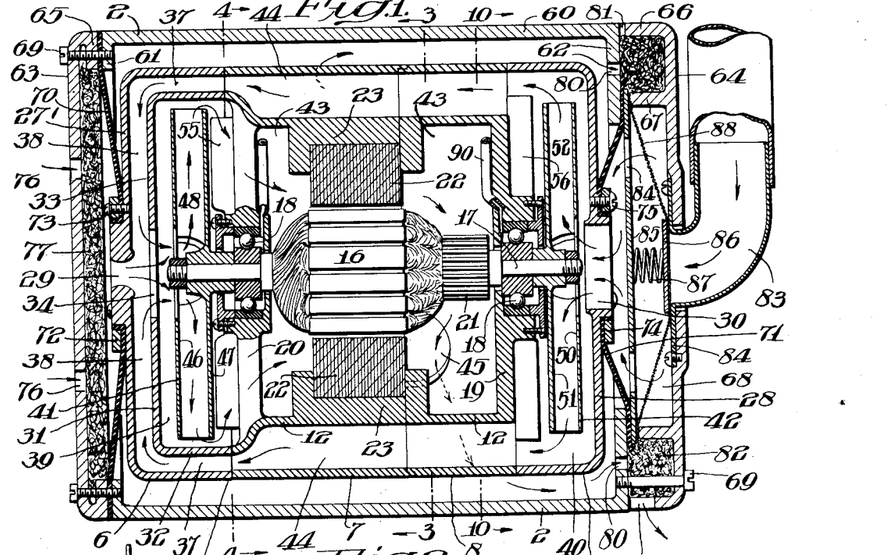
Figure 1 is a longitudinal section through a suction producing machine embodying our invention.
Figure 2:
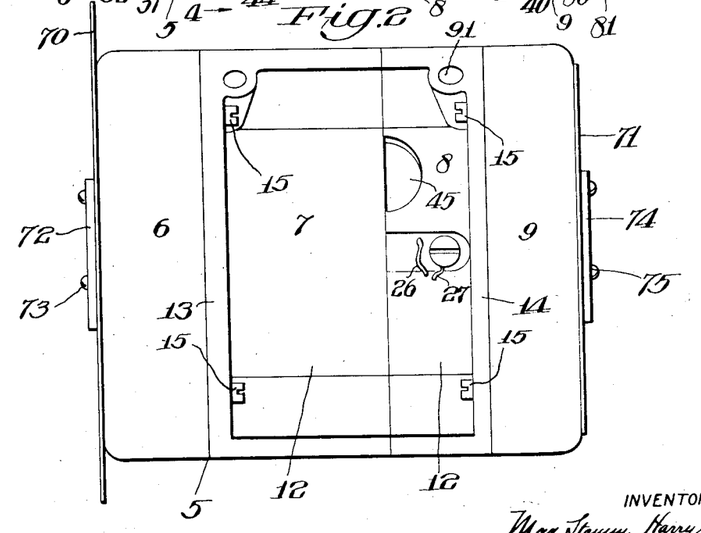
Figure 2 is a side view of the motor frame removed from the sound muffling casing.
Figures 5, 6, 7, 8, 9:
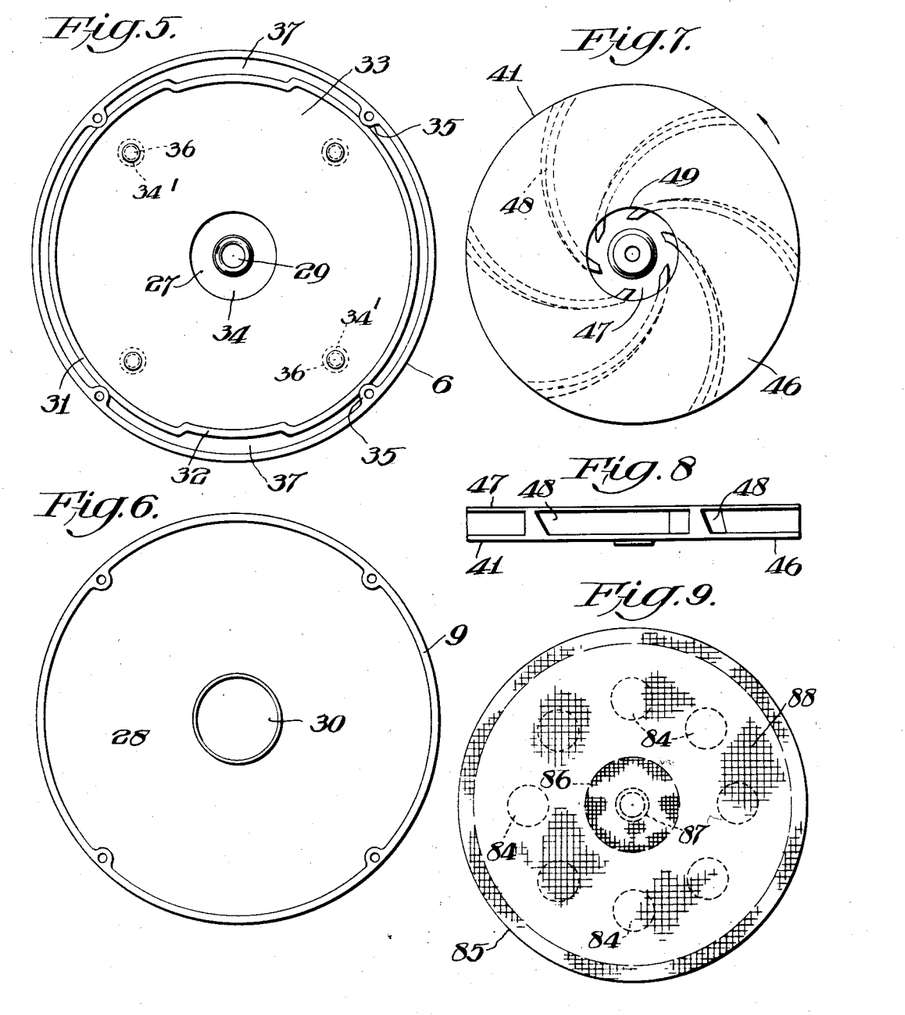
Figure 5 is an inside view of one of the end sections of the motor frame.
Figure 6 is an inside view of one of the end sections of the motor frame.
Figure 7 is a face view of one of the air driving fans.
Figure 8 is a top view of the fan.
Figure 9 is a face view of one of the air filtering screens.

The air driving fan 41 comprising two spaced discs 46 and 47 connected by curved blades or wings 48 which extend from near the central portion of the fan to the outer edges of the discs 46 and 47 and form air passages between them as clearly shown in Figs. 1 and 7. The outer disc 46 has a central air inlet opening 49 opposite and in close relation to the opening 34, whereby, when the armature shaft 17 rotates the fan 41, air will be drawn thereby through the openings 29, 34 and 49 and into the fan 41 and driven radially outward between the discs 46 and 47 and into and through the chambers 39 and 43 and out through the openings 45, as shown by the arrows in Fig. 1.

Figure 11:
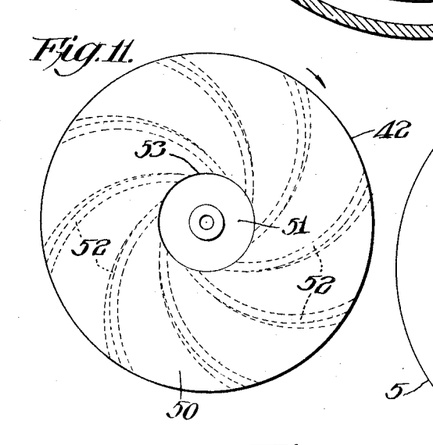
Figure 11 is a face view of one of the air driving fans.
Figure 12:
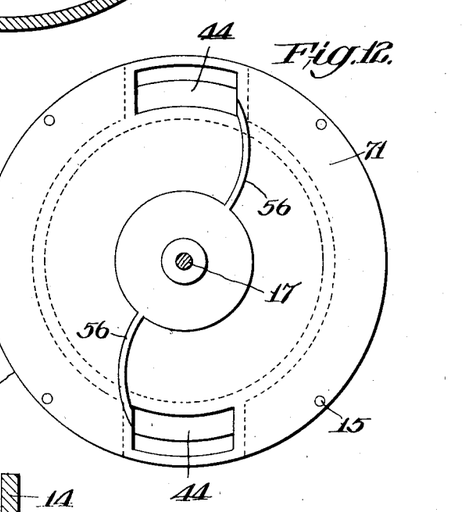
Figure 12 is a view of one end of the motor frame.
Figure 13:
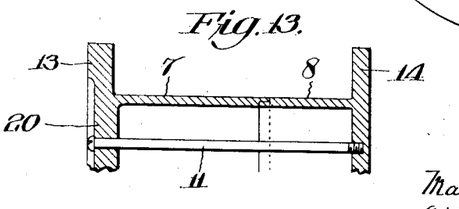
Figure 13 is a detail showing one of the tie bolts for uniting sections of the motor frame.

The air driving fan 42 is constructed similarly to the fan 41; that is to say it comprises two spaced discs 50 and 51 connected by curved blades or wings 52 which extend from near the central portion of the fan to the outer edges of the discs 50 and 51. and form air passages between them, as clearly shown in Figs. 1 and 11. The outer disc 50 has a central air inlet opening 53 opposite and in close relation to the opening 30, whereby, when the shaft 17 rotates the fan 42, air will be drawn thereby through the openings 30 and 53 into the fan 42 and driven radially outward between the discs 50 and 51 into and from the outer portion of the chamber 40 to and through the passages 44, 37 and 38 to the opening 34 where it joins the air drawn into the motor frame through the opening 29 by the fan 41. The air from the fan 42 passes through the opening 34 into and through the fan 41 to the chamber 39 and thence through the chamber 43 to and through the outlet openings 45.

From the foregoing description it will be seen that when current is supplied to the motor, the fans 41 and 42 will be driven thereby in a manner to draw air into the motor frame 5 through the openings 29 and 30, respectively, and that the air from each fan will be driven through the chamber 43 through the spaces between the armature and field elements of the motor and the spaces between the parts thereof and the cylindrical wall 12 to and through the outlet openings 45. The effect of this is to cause the air to carry off the heat generated by the motor and to keep its parts cool during the operation thereof.

It will be observed that the stream of air driven through the motor frame by the fan 42 is divided by the passages 44 so as to embrace and thereby have a cooling effect upon the heat generating parts of the motor, and that the divided portions of the stream then unite in a common return portion of the air passage formed by the chambers 39 and 43 and act with cooling effect directly against the heat generating elements of the motor within the chamber 43, reinforced by the current of air drawn into the motor frame 5 through the opening 29 by the fan 41 and driven thereby through the chambers 39 and 43.

The wall 19 and arm 20 are provided with suitable wings or blades 55 and 56 which project therefrom toward the fans 41 and 42, respectively, to prevent eddy currents from being produced between the fans 41 and 42 and the walls 20 and 19, respectively, adjacent thereto.

The air driving fans 41 and 42 draw air into the motor frame from opposite directions and, therefore, each fan exerts a pull on the armature shaft 17 in opposition to the pull of the other, longitudinally of the shaft, so that the action of one fan will neutralize the action of the other so far as the tendency of either fan to move the shaft 17 longitudinally is concerned. This operation of the fans provides a very smooth and easy running machine which does not require a thrust bearing for the shaft 17, and it enables us to employ the type of ball bearings illustrated, which, as is well known, is a very easy direct running bearing and has only limited provision for resisting end thrust. If one of the fans were eliminated or if the two fans were arranged to exert a pull in the same direction on the shaft 17 longitudinally thereof, as has been done heretofore in some instances, it would be necessary to employ a counteracting thrust bearing with the increased friction and noise incident thereto.

The construction of the motor casing and the arrangement of the air passages therein together with the disposition of the fans relatively to the armature provides a simple and efficient machine which may be easily balanced for smooth and easy running, and in which two fans may be carried by the armature shaft beyond the respective ends of the armature and yet be included in a continuous air passage and operated in series to drive air therethrough, enabling us to draw air into the said passage through an auxiliary air opening, such as the opening 29, in communication with the passage at a point between the two fans therein. This is an important feature of our invention because it enables us to connect the inlet opening 30 with a suction operated device to exhaust air therefrom, which air of itself is inadequate to keep the motor sufficiently cool for running long periods of time without the help of the air admitted through the auxiliary opening 29. Further the provision of the auxiliary air inlet 29 through which the fan 41 draws supplementary air current acts as a check to decrease the degree of suction produced within the pipe 83, the size of the opening 29 with relation to the other air passages leading to the fan 41 determining the degree of suction.

The invention thus far described is perfectly operative without the sound muffling casing 2 hereinbefore referred to, but, without such casing, considerable noise would attend the operation of the machine, due to the moving parts therein, the air entering the openings 29 and 30 being driven out through the openings 45, and the peripheral speed of the fans 41 and 42 discharging air therefrom.

We shall now describe the construction of the sound muffling casing 2 and the parts associated therewith and their relation to the motor for the elimination or substantial elimination of the said noise.

The casing 2 comprises a cylindrical body portion 60 having inwardly extending flanges 61 and 62 on the respective ends thereof, and end heads 63 and 64 closing the respective ends of the body portion 60. The head end 63 has an inturned flange 65 adjacent to the flange 61 of the body portion 60, and the end head 64 has two inwardly-extending, concentric, annular flanges 66 and 67, suitably spaced to provide an annular space between them, and to provide a space or chamber 68 surrounded by the inner flange 67. The heads 63 and 64 are secured to the body portion 60 by suitable cap screws 69 which penetrate the heads 63 and 64 and are screwed into the adjacent flanges 61 and 62 of the body portion 60.

The entire motor frame 5 is suspended within the casing 2 and maintained out of contact therewith by and between two disc-like diaphragms 70 and 71 of suitable sound deadening material, such as rubberized duck or other fabric.

The outer portion of the diaphragm 70 is attached to the casing 2 by being clamped by and between the flanges 61 and 65 of body portion 60 and end head 63, of the casing, and the inner portion of the diaphragm 70 is attached to the motor frame 5 by being clamped between the end wall 27' thereof and a clamping ring 72 which surrounds the air inlet opening 29 and is connected to the wall 27' by means of screws 73. The outer portion of the diaphragm 71 is attached to the casing 2 by being clamped with other parts hereinafter referred to by and between the flanges 62 and 66 of the body portion 60 and end head 64 of the casing, and the inner portion of the diaphragm 71 is attached to the motor frame 5 by being clamped between the end wall 28 thereof and a clamping ring 74 which surrounds the air inlet opening 30 and is connected to the wall 28 by means of screws 75. The diaphragms 71 and 72 have central openings therein within the clamping rings 72 and 74 so as not to obstruct the air inlet openings 29 and 30 of the motor frame.

The end head 63 of the casing 2 has air inlet openings 76 therein, and these openings 76 together with the space within the casing 2 which is surrounded by the flange 65 and the diaphragm 70 forms an air passage through which the atmospheric air surrounding the casing 2 may be drawn into the inlet opening 29 of the motor frame. A suitable muffler in the nature of a loose felt pad 77 is provided in this air passage between the end head 63 and the diaphragm 70 to break up the air current and prevent this hissing noise which would otherwise occur if the air were permitted to rush unchecked through the openings 76 and 29. The felt pad 77 also serves to filter the air and thereby prevent any dirt or dust from being drawn into the motor through the inlet opening 29.

When the air is discharged from the motor frame through the openings 45 therein the air enters the casing 2 within the cylindrical body 60 thereof between the diaphragms 70 and 71, which are air tight, and passes therefrom through openings 80 in the flange 62 into the space between the flanges 66 and 67 and thence through openings 81 in the flange 66 to the outside atmosphere. The annular space between the flanges 66 and 67 is filled with suitable soft felt 82 which serves to break up the air current and act as a muffler to prevent the hissing sounds which would occur if the air passed unobstructed through the openings 80 and 81.

The end head 64 has a central opening therein, and extending through this opening is a pipe 83 having a flange 84 on the inner end thereof fitted against the inner face of the end head 64 and secured thereto by suitable screws. This pipe 83 is in communication with the inlet opening 30 of the motor frame 5 through the chamber 68, openings 84 in a partition plate 85 and through the diaphragm 71. The inner end of the pipe 83 is normally closed by a valve plate 86 carried by a spring 87 which in turn is carried by the partition plate 85. The spring 87 extends between the plate 86 and partition 85 and presses the valve plate 86 toward the pipe 83. When the fans 41 and 42 are operated to draw air through the opening 30 the air is drawn from the pipe 83 and through the chamber 68, and, as the air enters the chamber 68 it moves the valve plate 86 back from the pipe 83 against the action of the spring 87. When the operation of the fans ceases, the spring 87 returns the valve plate 86 to its closed position.

The air drawn from the pipe 83 by the fans, in passing through the chamber 68, passes through a filtering screen 88 of suitable gauze or cloth. This screen is disc-like in form and has its edge portion attached to the edge of the partition plate 85 and it is clamped therewith and with the diaphragm 71 by and between the flanges 61 and 62 of the end head 64 and body portion 60 of the casing 2. The central portion of the screen 88 is carried by the valve plate 86. The screen 88 serves to prevent dust and dirt from being drawn into the motor from the pipe 83; and the back and forth movement of the valve plate 86, in opening and closing the pipe 83 to the chamber 68, agitates the screen 88 and thereby dislodges particles of dust and dirt which would otherwise tend to clog the screen and prevent the free passage of air therethrough.

The outer portion of the pipe 83 is adapted to be connected to the exhaust opening of a suction operated device of any suitable character, such as a piano, organ or other instrument or machine. When the pipe 83 is thus connected, the fans 41 and 42 will, when the motor drives them, draw air from the pipe 83 for the operation of the device to which it is connected, and the air drawn therefrom will be driven through the air passages in the motor frame 5 and out through the casing openings 81 and thus serve to keep the motor cool during the operation thereof.

The suspension of the entire motor frame 5 within the casing 2 by the sound deadening diaphragms 70 and 71 which maintain the motor frame 5 and casing 2 out of contact with each other, confines within the closed casing 2 all noises incident to the operation of the moving parts of the machine during the operation thereof, providing an extremely quiet or substantially noiseless machine.

It will be understood that the casing 2 in confining the noise of the moving parts also tends to confine the heat generated by the motor within the casing. Under this condition the limited amount of air drawn through the pipe 83 from the suction operated device connected thereto and driven through the air passages of the motor frame 5 is insufficient to carry off all the heat generated by the motor. Therefore, it is necessary to provide the auxiliary air inlet openings 76 and 29 to permit the fans 41 and 42 to draw from the outside atmosphere into the motor frame 5 and drive through the air passages thereof a sufficient quantity of air to carry off the heat generated by the motor to keep the temperature thereof down to proper working conditions.

To oil the bearings 18 we provide oil pipes 90 leading thereto from flaring openings 91 in the top of the motor frame 5, into which oil may be dropped through openings in the casing 2 above the same. The oil openings in the casing are normally closed by the usual well known self closing oil hole covers.

We claim as our invention:

1. The combination of an electric motor having a frame and an armature shaft journaled therein, said frame forming an air passage having an inlet and an outlet and enclosing the armature and field elements of the motor, and two air driving devices carried by the armature shaft within said passage, each of said devices exerting a pull on the armature shaft in opposition to the pull of the other longitudinally of the shaft during the operation of the motor, and said devices operating in series to drive air through said passage from the inlet to the outlet thereof during the operation of the motor.

2. The combination of an electric motor having a frame and an armature shaft journaled therein, said frame forming an air passage having an inlet and an outlet and enclosing the armature and field elements of the motor, and two air driving devices carried by the armature shaft beyond the respective ends of the armature carried thereby, each of said devices exerting a pull on the armature shaft in opposition to the pull of the other longitudinally of the shaft during the operation of the motor, and said devices operating in series to drive air through said passage from the inlet to the outlet thereof during the operation of the motor.

3. The combination of an electric motor having a frame and an armature shaft journaled therein, and two air driving devices carried by the armature shaft beyond the respective ends of the armature carried thereby, said frame forming an air passage enclosing and leading from one of the air driving devices and having a bend therein and a return portion enclosing the other air driving device and the armature and field elements of the motor, and said devices operating in series to drive air through said passage from the inlet to the outlet thereof during the operation of the motor.

4. The combination of an electric motor having a frame and an armature shaft journaled therein, said frame forming an air passage having an inlet and an outlet, said passage including a chamber enclosing the armature and field elements of the motor and said passage having a divided portion embracing said chamber, and two air driving devices carried by the armature shaft beyond the respective ends of the armature carried thereby, one of said devices being located in said passage in advance of its divided portion, and the other of said devices being located in said passage between its divided portion and said armature and field elements within said passage, each of said devices exerting a pull on the armature shaft in opposition to the pull of the other longitudinally of the shaft during the operation of the motor, and said devices operating in series to drive air through said passage from the inlet to the outlet thereof during the operation of the motor.

5. The combination of an electric motor having a frame and an armature shaft journaled therein, said frame forming an air passage having an inlet and an outlet and enclosing the armature and field elements of the motor, and two air driving devices carried by the armature shaft within said passage, said devices operating in series to drive air through said passage from the inlet to the outlet thereof during the operation of the motor, and the wall of said passage having an auxiliary air inlet opening admitting air to said passage between said devices.

6. The combination of an electric motor having a frame, an armature shaft journalled therein, and two air-driving devices carried on the respective ends of said shaft, said frame forming at one end thereof an air passage, having an air inlet, and enclosing one of said air-driving devices, said frame including an interior wall, forming a centrally-disposed air chamber enclosing the armature and field elements, and having an air outlet in the wall thereof, and said central chamber having an extension end, with an air inlet therein, and enclosing the other of said air-driving devices, said frame also including a communicating air passage between said first mentioned passage and the air inlet leading to said central chamber and its extension thereof, and surrounding the walls of the same.

7. The combination of an electric motor having a frame and an armature shaft journalled therein, two air driving devices carried on the respective ends of said shaft, said frame forming at one end thereof an air passage, having an air inlet, and enclosing one of said air driving devices, said frame including an interior wall forming a central chamber enclosing the armature and field elements and having an air outlet in the wall thereof, said central chamber having an extension end, with an air inlet therein, and enclosing the other of said air driving devices, said frame also including a divided passage way surrounding the wall of said central chamber in the region of the armature and field elements therein and establishing communication between said first mentioned passage and the inlet to said central chamber and its extension containing the second of said air driving devices and the armature of the motor.

8. The combination of an electric motor, a frame therefor, an armature shaft journalled in said frame, two air-driving devices carried on the respective ends of said shaft, said frame forming at one end thereof an air chamber, with a main air inlet, and enclosing one of said air-driving devices, said frame including a wall forming a central air chamber, and an extension thereof, enclosing the armature and field elements and the second of said air-driving devices, said frame also including an exterior section within which said extension chamber is mounted in spaced relation, forming passage ways between them, said exterior section and said extension chamber having aligning air inlets, and said frame including a passage way establishing communication through the said last mentioned passage ways, between the respective chambers containing the two air driving devices.

9. The combination of an electric motor having a frame and an armature shaft journaled therein, said frame forming an air passage having an inlet and an outlet and enclosing the armature and field elements of the motor, and two air driving devices carried by the armature shaft within said passage, said devices operating in series to drive air through said passage from the inlet to the outlet thereof during the operation of the motor, the wall of said passage having an auxiliary air inlet opening admitting air to said passage between said devices, and a sound muffling device interposed in the path of the air drawn through said auxiliary air inlet opening.

10. The combination of an electric motor having a frame and an armature shaft journaled therein, said frame forming an air passage having an inlet and an outlet and enclosing the armature and field elements of the motor, and two air driving devices carried by the armature shaft within said passage, said devices operating in series to drive air through said passage from the inlet to the outlet thereof during the operation of the motor, a sound muffling device interposed in the path of the air expelled from said outlet, the wall of said passage having an auxiliary air inlet opening admitting air to said passage between said devices, and another sound muffling device interposed in the path of the air drawn through said auxiliary air inlet opening.

11. The combination of a sound muffling casing, having an air outlet, a motor frame having a centrally-disposed air inlet in one end wall thereof, an electric motor wholly within the frame, an armature shaft on which it is journalled, means for supporting the motor frame within the casing in spaced relation to and out of contact therewith, said means including a disc-like sound-deadening diaphragm interposed between and attached to the casing and the motor frame and surrounding said central air inlet in an end wall of the motor frame, and means mounted on and actuated by the armature shaft for drawing air into the motor frame through said air inlet therein during the operation of the device.

12. The combination of a sound muffling casing, an electric motor therein having a frame provided with end walls, two sound deadening diaphragms having their inner portions secured to the respective end walls of the motor frame and their outer portions secured to the casing and supporting the motor within the casing in spaced relation thereto and out of contact therewith, and means for cooling the motor during the operation thereof.

13. The combination of an electric motor having a frame provided with end walls, a sound muffling casing enclosing the motor and comprising a body portion surrounding the motor and end heads secured to the body portion, two sound deadening diaphragms supporting the motor within the casing in spaced relation thereto and out of contact therewith, the inner portions of said diaphragms being secured to the respective end walls of the motor frame and the outer portions thereof being clamped between the body portion and the respective end heads of the casing, and means for cooling the motor during the operation thereof.

14. The combination of an electric motor having a frame and an armature shaft journaled therein, and two air driving devices carried by the armature shaft, each of said devices exerting a pull on the armature shaft in opposition to the pull of the other longitudinally of the shaft during the operation of the motor, one of said devices being in operative association with a part forming an air passage to draw air into the passage and to deliver the air to parts of the motor to cool the same during the operation thereof, and the other of said devices being in operative association with a part forming an air passage adapted to be connected to a suction operated device to draw air therefrom during the operation of the motor.

15. The combination of an electric motor having a frame and an armature shaft journaled therein, and two air driving devices carried by the armature shaft, each of said devices exerting a pull on the armature shaft in opposition to the pull of the other longitudinally of the shaft during the operation of the motor, one of said devices being in operative association with a part forming an air passage to draw air into the passage and to deliver the air to parts of the motor to cool the same during the operation thereof, and the other of said devices being in operative association with a part forming an air passage adapted to be connected to a suction operated device to draw air therefrom and to deliver the air to parts of the motor to cool the same during the operation thereof.

16. The combination of a sound muffling casing having an air outlet, an electric motor having a frame supported in said casing in spaced relation thereto and out of contact therewith and also having an armature shaft journaled in said frame, an annular sound deadening diaphragm extending between and secured to said casing and said frame and forming part of the wall of an air passage leading from the exterior to the interior of the casing, and an air driving device carried by said shaft in operative association with said passage to draw air into the casing through said passage and to drive the air out through said outlet.

17. The combination of a sound muffling casing having an air outlet, an electric motor therein having a frame and an armature shaft journaled in the frame, means for suspending the motor frame within the casing in spaced relation thereto and out of contact therewith, said means including an annular sound deadening diaphragm extending between and attached to said casing and said frame and forming part of the wall of an air passage leading from the exterior to the interior of the casing, and an air driving device carried by said shaft in operative association with said passage to draw air into the casing through said passage and to drive the air out through said outlet.

18. The combination of a sound muffling casing having an air outlet, an electric motor therein having a frame and an armature shaft journaled in the frame, two annular sound deadening diaphragms extending between the respective ends of said casing and the respective ends of said frame and forming parts of the walls of two separate air passages leading from the exterior to the interior of the casing and suspending said frame within the casing in spaced relation thereto and out of contact therewith, an air driving device carried by said shaft in operative association with one of said passages to draw air therethrough into the casing and drive the air out through said outlet, and an air driving device carried by said shaft in operative association with the other of said passages to draw air therethrough into the casing and drive it out through said outlet.

19. The combination of a sound muffling casing having an air outlet, an electric motor therein having a frame and an armature shaft journaled in the frame, two annular sound deadening diaphragms extending between the respective ends of said casing and the respective ends of said frame and forming parts of the walls of two separate air passages leading from the exterior to the interior of the casing and suspending said frame within the casing in spaced relation thereto and out of contact therewith, an air driving device carried by said shaft in operative association with one of said passages to draw air therethrough into the casing and drive the air out through said outlet, and an air driving device carried by said shaft in operative association with the other of said passages to draw air therethrough into the casing and drive it out through said outlet, said frame forming an air passage enclosing the armature and field elements of the motor and through which the air driven by one of said devices passes on its way to said outlet.

20. The combination of a casing having an air inlet opening and an air outlet opening and enclosing an air passage extending between said openings, a valve plate adapted to close the inlet opening, a spring pressing said plate toward the inner wall of the casing around said opening, a flexible screen having a part carried by the valve plate and a part attached to the casing and interrupting said passage, and an air driving device within said passage and operative to draw air through the inlet opening and said screen and drive the air through said passage to and through said outlet opening.

21. The combination of a casing having an air inlet opening and an air outlet opening and enclosing an air passage extending between said openings, a valve plate adapted to close the inlet opening, a spring pressing said plate toward the inner wall of the casing around said opening, a flexible screen having a central portion carried by the valve plate and an edge portion surrounding the valve plate in spaced relation thereto and attached to the casing, the screen between the attached edge portion thereof and the valve plate interrupting said passage, and an air driving device within said passage and operative to draw air through the inlet opening and said screen and drive the air through said passage to and through said outlet opening.

22. The combination of a container having an inlet and an outlet, a centrally apertured transversely extending wall within said container, a baffle-plate positioned between said inlet and the aperture of the said wall, a fan upon the opposite side of said wall, a second fan spaced away from said first fan, means to drive said fans, a channel to convey air from said first fan to the opposite side of said second fan, a channel to convey air from the nearer side of said second fan through said means to cool the latter, and a channel to lead the air from said means towards said outlet.

In testimony whereof we have hereunto affixed our signatures this 11th day of March, A. D. 1920.

MAX STAMM.
HARRY TUCKER.
MARTIN J. PELTZ.

Witnesses:
I. M. TUNIS,
ALEXANDER PARK.